UNITED STATES PATENT OFFICE.

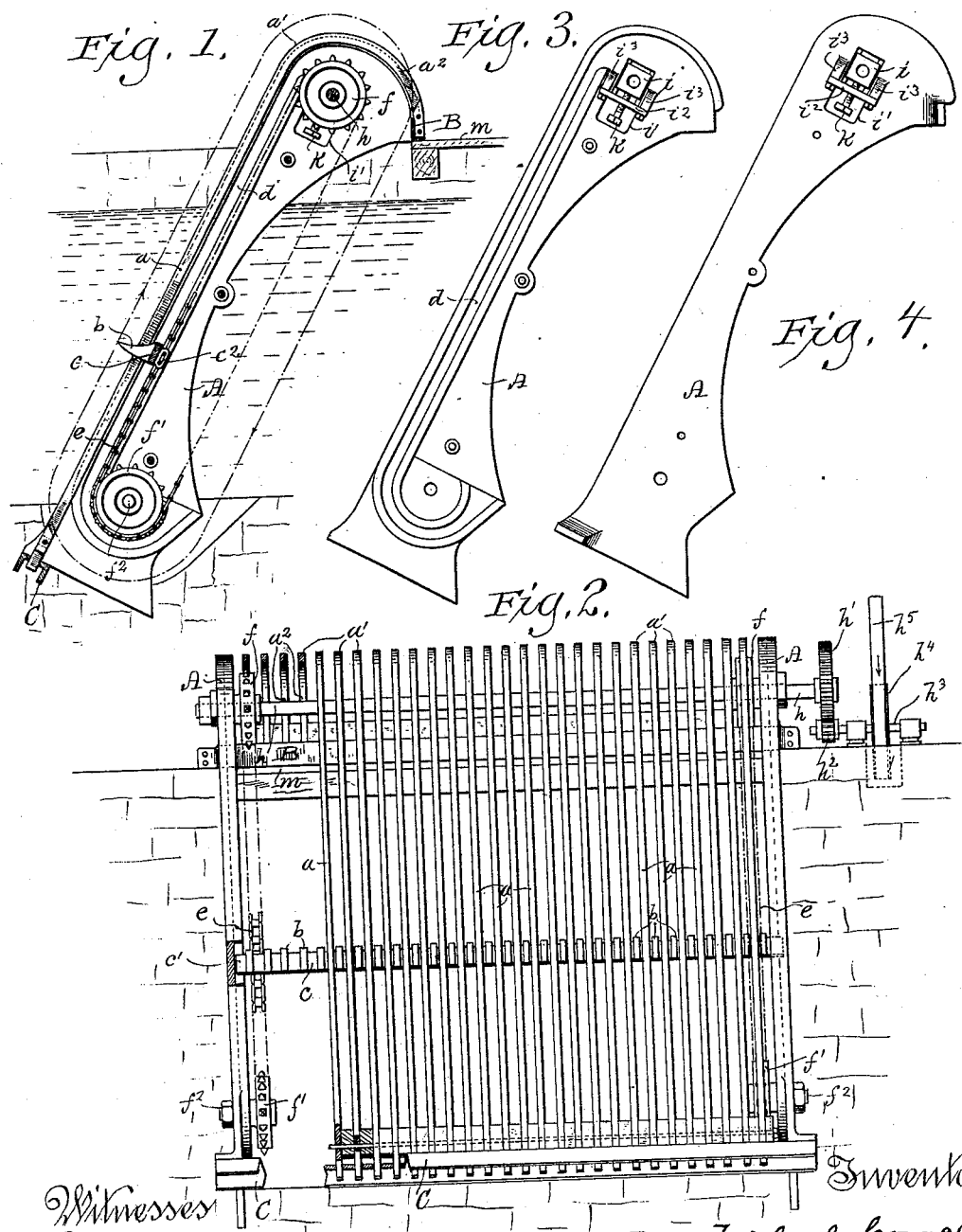

FRIEDRICH CORRELL, OF FRANKFORT-ON-THE-MAIN, GERMANY.

MEANS FOR COLLECTING AND REMOVING FLOATING DÉBRIS.

SPECIFICATION forming part of Letters Patent No. 452,595, dated May 19, 1891.

Application filed March 12, 1891. Serial No. 384,795. (No model.) Patented in Germany October 23, 1889, No. 52,981; in Switzerland November 14, 1889, No. 1,589; in England January 11, 1890, No. 565; in Belgium January 14, 1890, No. 89,170; in Austria-Hungary February 26, 1890, No. 49,416 and No. 5,651, and in France April 22, 1890, No. 205,220.

*To all whom it may concern:*

Be it known that I, FRIEDRICH CORRELL, a subject of the Emperor of Germany, and residing at Frankfort-on-the-Main, Germany, have invented new and useful Improvements in Means for Collecting and Removing Floating Débris and the Like in Rivers, Canals, and other Streams, (and for which patents have been obtained as follows: in Germany October 23, 1889, No. 52,981; in Switzerland November 14, 1889, No. 1,589; in Austria-Hungary February 26, 1890, No. 49,416 and No. 5,651; in Belgium January 14, 1890, No. 89,170; in England January 11, 1890, No. 565, and in France April 22, 1890, No. 205,220,) of which the following is a specification.

This invention relates to an apparatus for collecting and removing débris and the like in rivers, canals, and other streams, and is especially adapted for use in connection with water-wheels, turbines, and pumps for the purpose of preventing foreign matter from entering and clogging them.

My apparatus consists, essentially, of a grating extending from the bottom of the stream to some distance above the surface thereof and of a rake or comb entering the spaces between the grating-bars and clearing the same of the débris which is carried to them by the water. The upper ends of the grating-bars are turned backward and downward to a platform to allow the débris to be carried over them, fall down, and be collected on the platform. The teeth of the comb enter the spaces between the grating-bars from behind and stand out with their tips at the front side. The comb is moved from the bottom of the stream along the bars to a point near the platform where the teeth leave the grating.

In order to enable everybody skilled in the art to carry into practice my invention, I will describe it more particularly, reference being had to the accompanying drawings, in which—

Figure 1 is a vertical section of an apparatus embodying my invention. Fig. 2 is a front elevation of the same. Figs. 3 and 4 are views of the inner and outer sides of one of the end supporting-standards of the apparatus.

Similar letters refer to similar parts in all the figures.

A A are the standards secured to the side walls of the canal and carrying the cross-pieces B and C, to which the ends of the grating-bars $a$ are fastened in any suitable way. I prefer to give an inclination to the straight portion of the bars and to bend the upper parts $a'$ and $a^2$ in a way that the débris gathered by the comb-teeth at the front side of the bars is carried over it and falls down by itself when released of the pressure of the comb.

$b\ b$ are the comb-teeth fitted to a bar $c$, the ends of which bar are formed into or provided with guide-blocks $c'\ c'$, moving in guide-grooves $d$ made in the standards A, whereby the teeth $b$ of the comb are prevented from being pushed backward or borne down or tipped over by the pressure of the material.

$e\ e$ are the chains on which the bar $c$ is mounted, as shown at $c^2$, and $f f'$ are the chain-wheels which carry the chains, the wheels $f$ being mounted on a revolving shaft $h$ and the wheels $f'$ mounted on pivots or studs $f^2$. The bearings $i$ of the shaft $h$ are adjustable in slots $i'$ in the standards A A to match any lengthening of the chains and to regulate their tightness by turning the adjusting-screws $k$, passing through bars or plates $i^2$, secured to lugs $i^3$ on said standards. The shaft $h$ may be rotated by hand or by power, as indicated in Fig. 2, where I show gear $h'$, pinion $h^2$ on shaft $h^3$, pulley $h^4$, and power-belt $h^5$.

Whenever a great height of the grating is required I prefer to attach several combs to the chains, so that one comb at least will be between the bars of the grating at any time and prevent them from being bent sidewise. The teeth of the comb are made of considerable thickness at the base, so as to present an inclined plane upward and to facilitate the removal of substances—such as pieces of wood—which otherwise might be jammed in between the bars. The bar $c$, carrying the comb, moves upward at the back of the grating, and the teeth pass between the bars of the same and carry all dirt, leaves, wood, &c., which are collecting at the front side to the top. As the comb moves farther it shoves the material over the circular part $a'$ of the bars to the part $a^2$, where it slides down to the platform $m$ by its own weight while the adhering water is dropping off. The comb then passes downward and, gradually quitting the part $a^2$ of the grating-bars, leaves all foreign matters behind. The teeth of the comb thus get cleared and enter the grating again at its bottom after awhile. The material gathering on the platform may be carried away from time to time.

When the side walls of the canal allow of it, the solid standards A may be replaced by simple guide rails or bars for the bar $c$. If the canal is very broad, intermediary standards must be placed amid the stream and fixed at the bottom thereof and stiffened against each other by tie-bars. Additional guides for the bar $c$ may be arranged if the same is necessary.

Whenever it seems advisable to remove the entire grating in the winter or when it gets impracticable for other reasons I prefer to arrange the whole grating swinging around a shaft and to turn it upward outside the water whenever it is required.

I am aware that there have been mechanical cleaning apparatuses; but I do not think that there has been any furnished with a comb at the back of the grating.

What I claim, and desire to secure by Letters Patent, is—

1. The combination, with a grating, of a comb whose teeth enter between the grating-bars from the back and of means to move the comb along the bars.

2. The combination, with grating-bars having their upper ends curved backward and downward, of a platform and of a comb and means to move the latter, substantially as described.

3. The combination, with a grating having the upper ends of its bars curved backward, of one or more combs and of chains and chain-wheels carrying the same, substantially as and for the purpose specified.

In testimony whereof I have signed my name to this specification in the presence of two subscribing witnesses.

FRIEDRICH CORRELL.

Witnesses:
JEAN GRUND,
ALVESTO P. HOGUE.